United States Patent [19]
Copeland et al.

[11] 4,201,910
[45] May 6, 1980

[54] PHOTOSENSOR ASSEMBLY

[75] Inventors: James S. Copeland; Raymond Primm, both of Roswell, N. Mex.

[73] Assignee: Innovation Industries, Inc., Roswell, N. Mex.

[21] Appl. No.: 890,066

[22] Filed: Mar. 27, 1978

[51] Int. Cl.$^2$ ................................................ H01J 3/14
[52] U.S. Cl. ....................................... 250/216; 250/239
[58] Field of Search ................... 250/566, 221, 237 G, 250/222, 223, 239, 216

[56] References Cited
U.S. PATENT DOCUMENTS

| | | | |
|---|---|---|---|
| 3,456,997 | 7/1969 | Stites et al. | 250/566 |
| 3,523,191 | 8/1970 | Street | 250/237 G |
| 3,740,562 | 6/1973 | Fertig | 250/221 |
| 3,816,745 | 6/1974 | Primm et al. | 250/221 |

*Primary Examiner*—David C. Nelms
*Attorney, Agent, or Firm*—Thorpe, North & Gold

[57] ABSTRACT

A photosensor system includes a housing in which are defined a primary passage, and a secondary passage intersecting the primary passage at substantially a right angle. A light source is disposed in the secondary passage to direct light toward the intersection of the passages, and a beam splitter plate is disposed at the intersection at about a 45° angle with the primary passage to direct light from the light source toward one end of the primary passage. Disposed in that end of the primary passage is a lens for collimating the light rays and directing them outwardly of the housing. One side of the beam splitter plate contains a reflective finish or surface to reflect light impinging thereon, and the plate includes an aperture therein for allowing the passage of light. When light directed outwardly by the lens encounters a retroreflector, some of the light is reflected back through the lens and through the aperture in the beam splitter plate toward the other end of the primary passage. Disposed at the other end of the primary passage is a phototransistor for producing a signal in response to light impinging thereon.

8 Claims, 2 Drawing Figures

U.S. Patent May, 6, 1980 4,201,910

PHOTOSENSOR ASSEMBLY

BACKGROUND OF THE INVENTION

This invention relates to a beam splitter element and to a photosensor assembly which utilizes such beam splitter element.

Photosensor apparatus, in which a beam of light is directed outwardly from the apparatus to intercept and ultimately detect retroreflective material encountered by the beam, is utilized in a variety of circumstances including the controlling of movement of passenger and freight elevators, automatic warehouse handling systems, etc. It is important with such photosensor apparatus that the apparatus accurately detect the presence of the retroreflective material and that false detections be eliminated or greatly minimized since such false detections could cause erroneous operation of the elevator, automatic warehouse handling system, etc. Such false detection is typically caused by light, referred to as "noise", which finds its way into the apparatus so that the apparatus erroneously interprets such light as having been reflected from retroreflective material.

One of the primary aims in designing photosensor apparatus is to minimize the possibility of light "noise" interferring with the operation of the apparatus. An example of a photosensor designed with this in mind is disclosed in U.S. Pat. No. 3,214,569. This photosensor apparatus utilizes a conventional partial mirror type beam splitter for directing a light beam outwardly of the apparatus and then for directing reflected light towards a photocell. One of the problems with this apparatus is that light is reflected from the back surface of a focusing lens onto the partial mirror which then directs this reflected light to the photocell. This contributes to the light "noise" and thus to the possibility of false operation of the apparatus. Another problem with apparatus such as that described in the above-noted patent is that the partial mirror is quite fragile and thus subject to breakage if the apparatus is jarred or roughly handled. Finally, with apparatus such as that described, so-called bar codes composed of alternating areas of retroreflective and non-reflective material must have fairly large dimensions in order to be "read" by the apparatus. This is so because the "field of view" of the photocell of such apparatus is quite large, generally corresponding to the size of the projected beam of light.

SUMMARY OF THE INVENTION

It is an object of the present invention to provide a new and improved photosensor assembly.

It is another object of the present invention to provide a photosensor assembly which is substantially immune to stray light and background light "noise".

It is a further object of the present invention to provide a rugged and yet easy to construct photosensor assembly.

It is an additional object of the present invention to provide an optical beam splitter wherein the "field of view" to which an associated photocell is exposed may be limited as desired by the user.

It is also an object of the present invention to provide a photosensor assembly capable of "reading" bar codes having small dimensions.

These and other objects of the present invention are realized in a specific illustrative embodiment thereof which includes structure defining first and second passages, wherein the second passage intersects the first passage. A light source is disposed to direct light from the second passage to the intersection of the first and second passage. A lens is positioned at one end of the first passage and a beam splitter is positioned at the intersection of the first and second passage. The beam splitter includes a plate having an opening therein and a reflective surface on one side thereof for reflecting light from the light source toward the lens. Light is thus projected outwardly of the structure to be reflected back, by any retroreflective material encountered, through the lens and through the opening in the plate to light detecting apparatus disposed at the other end of the first passage.

In accordance with one aspect of the invention, the interior walls of the passages are covered with a nonreflective finish to limit the effect of and absorb stray light which may enter the passages. Also, the light source is adapted to produce infrared light, and visible light filters are positioned between the beam splitter and light detecting apparatus to filter out visible light while allowing the passage of infrared light.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
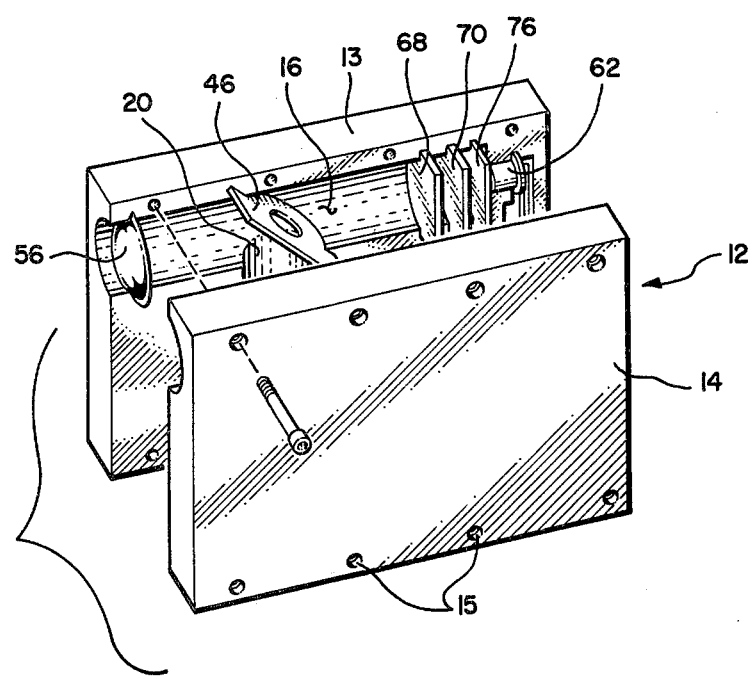
FIG. 1 shows a perspective, exploded view of a photosensor assembly made in accordance with the present invention.
Figure 2:
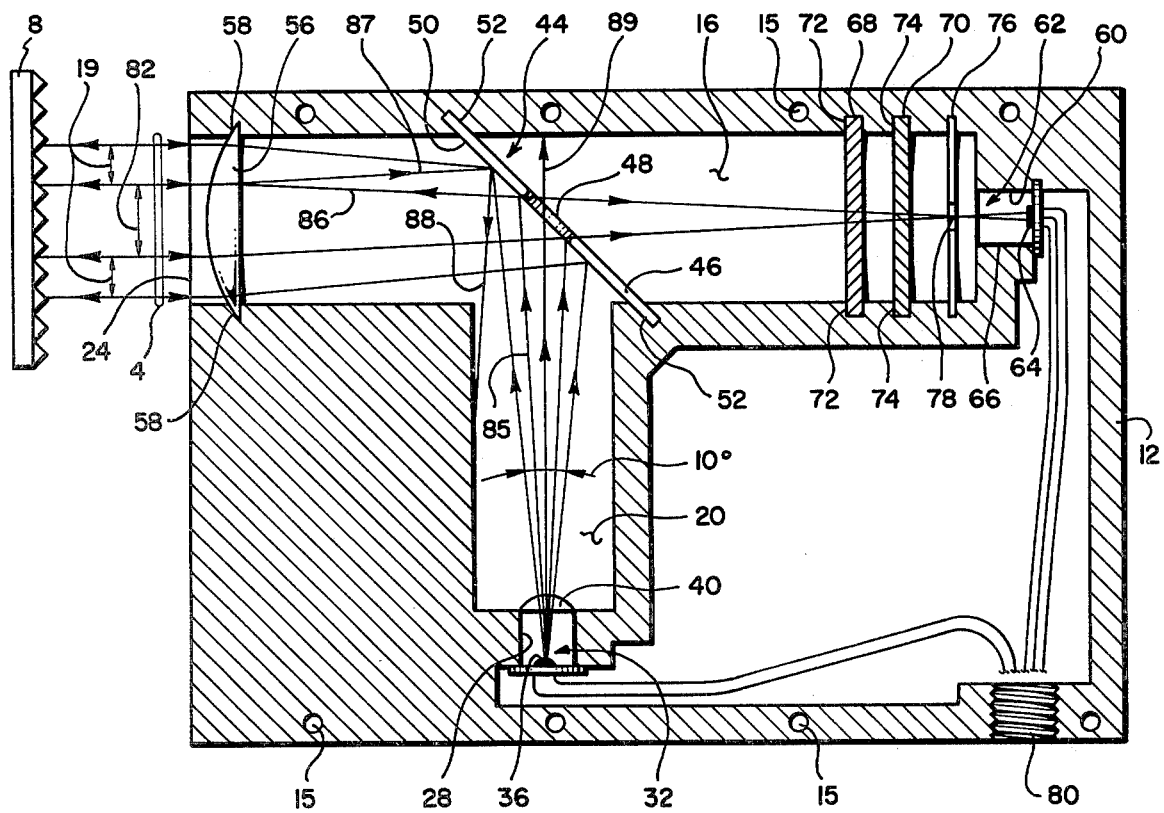
FIG. 2 shows a side, cross-sectional view of the photosensor assembly of FIG. 1.

The drawings show a photosensor assembly adapted to direct a beam of light 4 outwardly to intercept and impinge upon a retroreflector 8. The retroreflector 8 is a well known device for reflecting light back in substantially the same direction from which the light is received. The retroreflector 8 would, for example, be attached to articles being handled in an automatic warehouse handling system, to the different floor levels in an elevator shaft of a multistory building, etc., where such articles, levels, etc., are to be detected, counted, or the like. The retroreflector 8 reflects the beam of light 4 back toward the photosensor assembly for detection thereby.

The photosensor assembly includes a housing 12 composed of two halves 13 and 14 for containing the other elements of the assembly. The two halves 13 and 14 are secured together by bolts, rivets, or other suitable fasteners inserted in bores 15 located about the perimeter of the halves. Provision of a housing constructed in this fashion facilitates access to the housing interior to service the elements contained therein.

Defined in the housing 12 is a first or primary passage 16 and a second or secondary passage 20 which intersects the primary passage at substantially a right angle. The primary passage 16 extends from near a rear end of the housing 12 to a front end thereof to form an opening 24 in the front end. Advantageously, the primary and secondary passages 16 and 20 would have generally circular cross sections as illustrated in FIG. 1. The walls surrounding the passages are covered with a nonreflective finish such as a dull black coating of paint or the like.

Carried in the housing 12 in a recess 28 formed therein at the bottom of the secondary passage 20 is an infrared light source 32. Illustratively, the light source 32 is comprised of a light-emitting diode 36 whose infrared light output is directed into the passageway 20 by a focusing lens 40. The light generated by the light-emitting diode 36 diverges therefrom and is gathered by the lens 40 which reduces the degree of divergence of the light and directs it through the passage 20. Illustratively, the degree of divergence of the light rays from the lens 40 is ten degrees as indicated in the drawing.

Disposed in the intersection of the passage 16 and 20 is a beam splitter 44. The beam splitter 44 is composed of a generally flat plate 46 having an aperture 48 centrally located therein. The aperture 48 may be circular, elongate, or any other shape desired by the user to define the "field of view" which will be "seen" by a light detecting device to be discussed hereafter. One side 50 of the plate 46 is highly polished or coated with a light reflective finish to reflect light from the light source 32 along the passage 16 and out the opening 24 in the front end of the housing 12. To do this, the plate 46 is disposed in slots 52 formed in the walls of the passage 16 so that the plate is oriented at substantially a 45° angle with respect to the longitudinal axis of the passage. Advantageously, the plate 46 is constructed of aluminum, in which case, the side 50 of the plate could simply be polished to provide the necessary light reflective capability.

Positioned in one end of the passage 16 near the opening 24 is a collimating lens 56 oriented to project light rays reflected from the beam splitter 44 toward the retroreflector 8 in a generally collimated pattern. The use of such lens is well known. Advantageously, the lens 56 is positioned in the passage 16 and fixed therein by a suitable adhesive or by placement of the edge of the lens in slots 58 formed in the walls of the passage 16.

Disposed in a recess 60 formed in the housing 12 at the rear end of the passage 16 is a photoelectric device 62 capable of detecting infrared light. Advantageously, such device 62 might include a phototransistor 64 (or some other photodetector such as a photodiode, etc.) which becomes conducting when infrared light impinges thereon. The phototransistor 64 is carried in a cylindrical container 66 which fits snuggly and securely in the recess 60.

Positioned between the beam splitter 44 and the photoelectric device 62 are a pair of polarizers 68 and 70 which are carried respectively in slots 72 and 74 formed in the walls of the passage 16. The polarizers 68 and 70 are provided to remove or filter from the light directed toward the photoelectric device 62 any extraneous light in the visible portion of the light spectrum. Polarizer 68 is oriented so that its polarization axis is oriented at right angles to the polarization axis of polarizer 70. In this configuration, with the proper choice of polarization material such as type HN-32 manufactured by Polaroid Corporation, substantially all light which is in the visible portion of the light spectrum is filtered out by the polarizers while light in the infrared portion is not filtered.

Positioned between the polarizers 68 and 70 and the photoelectric device 62 is an opaque partition 76 carried in suitable slots formed in the wall of the passage 16. The partition 76 has an aperture 78 therein located at the focal point of light passing through the aperture 48 of the beam splitter 44. The function of the partition 76 is to intercept and stop stray light from reaching the photoelectric device 62.

Appropriate wiring for the light source 32 and photoelectric device 62 extends from the light source and photoelectric device inside the housing 12 to a single location where the wiring would be bundled into a rubber-covered cable which would be inserted into an opening 80 having circular ridges for securing the cable. Operation of the photosensor assembly will now be described.

When the light-emitting diode 36 is energized, it emits infrared light which is directed by lens 40 toward the reflective side of the beam splitter plate 52. Light rays which strike the plate (and not the aperture 48) are reflected toward the lens 56 which, in turn, directs the light outwardly of the housing 12. When the light encounters a retroreflector 8, the light is reflected back to the lens 56 which focuses the light and directs a portion of it through the aperture 48 toward the photoelectric device 62. The light rays returned from the retroreflector 8 are focused by the lens 56 toward the opening 78 in the partition 76. The aperture 48 in the plate 52 defines the "field of view" to which the photoelectric device 62 is exposed. If the aperture 48 is made larger, then the photoelectric device 62 has a larger field of view and vice versa.

Limiting this field of view, in turn limits and reduces the amount of stray light which might otherwise reach the photoelectric device 62 to cause erroneous operation of the device. As before discussed, polarizer 68 and 70 filter out visible light and partition 76 acts as a stop for all but a narrow beam of light passing through the aperture 48 of the plate 46.

When reflected light does impinge upon the phototransistor 64, the phototransistor is caused to conduct, thus producing a signal indicative of detection of a retroreflector.

Note that the light rays from the light source 32 which are reflected by the beam splitter 44 and which pass through the lens 56 out of the housing 12 have a so-called "dead spot" or hole 82 which is proportional in size and shape to the size and shape of the aperture 48. The field of view of the photoelectric device 62 is also proportional to the size and shape of the aperture 48 as discussed earlier and this field of view is within the "dead spot" of the light transmitted from the housing 12. At first it may appear that no light would be present in the dead spot to travel back through the aperture 48 to the photoelectric device 62 and this would be true if the lens 56 could collimate the light rays perfectly and if the retroreflector 8 could reflect the light rays back in exactly the same direction as that in which the rays are received. This is not possible, however, nor desirable in this case and as a result light directed outwardly of the housing 12 and reflected back from the retroreflector 8 "spills over" into the dead spot and travels through the aperture 40 to the photoelectric device 62 where it is there detected.

Also note that with the photosensor assembly described above, the problem of light being reflected from the back side of the lens 56 is eliminated. For example, light ray 85 from the light source 32 is reflected from the beam splitter 44 as light ray 86 to strike the rear surface of the lens 56. This light ray is then reflected from the lens 56 back toward the beam splitter 44 as light ray 87. Light ray 87 is reflected from the beam splitter 44 as light ray 88 and is absorbed by the nonreflective surfaces of the walls of passage 20. In a similar fashion, all light rays originating with the light source 32 which are reflected by the beam splitter 44 and which are further reflected from the back surface of lens 56 are ultimately absorbed by the nonreflective surface of the passages so as to cause no erroneous operation of the photoelectric device 62. Light rays passing from the light source 32 through the aperture 48 such as light ray 89 are similarly absorbed by the nonreflective surfaces of the passage 16.

With the photosensor assembly described above, the reading or detection of retroreflective bar codes having very small dimensions is possible. This is so because the field of view of the photoelectric device can be carefully controlled and can be reduced to accommodate smaller retroreflective areas which are used to create the bar codes. With prior art photosensors, the field of view of the photosensors is generally identical to the size of the beam of light projected from the sensor. There is no way to reduce this field of view except by focusing the projected beam of light, but then, the distances between the retroreflective material and the photosensor must be carefully controlled. This problem is obviated with the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A photosensor assembly comprising
   means defining a first passage,
   means defining a second passage which intersects said first passage,
   a light source disposed to direct light from said second passage to the intersection of said second passage with said first passage,
   a lens disposed at one end of said first passage,
   beam splitter means disposed in said first passage at the intersection of said second passage with said first passage, said beam splitter means including a plate having an opening therein, one side of said plate having a reflective surface for reflecting towards said lens light received from said light source,
   means disposed at the other end of said first passage for detecting light which shall have passed through said lens and the opening in said plate,
   said lens being positioned relative to said beam splitter means to focus and direct light received from outside said first passage through the opening in said plate to said detecting means.

2. An assembly as in claim 1 wherein the wall surfaces of said first and second passages have a nonreflective finish, said assembly further including an opaque partition disposed in said first passage between said beam splitter means and said light detecting means generally at the focal point of light passing from said lens through the opening in said plate, said partition having an aperture therein to allow passage of light from the direction of said beam splitter means to said light detecting means.

3. An assembly as in claim 2 wherein said second passage intersects said first passage at substantially a right angle.

4. An assembly as in claim 2 wherein said light source is adapted to produce infrared light, and wherein said light detecting means is adapted to detect infrared light.

5. An assembly as in claim 4 further including filter means disposed in said first passage between said beam splitter means and said light detecting means for filtering out from the light traveling through the opening in said plate toward said light detecting means substantially all light in the visible spectrum, and for transmitting therethrough the remaining light.

6. An assembly as in claim 5 wherein said filter means includes first and second polarizers whose polarization axes are oriented at right angles with respect to each other.

7. An assembly as in claim 2 wherein said light source is adapted to project light waves toward said beam splitter means, said light waves diverging by an angle of substantially ten degrees.

8. An assembly as in claim 2 wherein said lens is constructed to tend to collimate light waves directed thereto by said beam splitter means and to project the generally collimated light waves out from said first passage.

* * * * *